332-11

EXAMINE

July 14, 1953 R. A. HEISING Re. 23,686

COMMUNICATION SYSTEM

Orig. 2,539, 623

Original Filed Feb. 12, 1947 2 Sheets-Sheet 1

INVENTOR
R. A. HEISING
BY George C. Sell
ATTORNEY

July 14, 1953 R. A. HEISING Re. 23,686
COMMUNICATION SYSTEM
Original Filed Feb. 12, 1947 2 Sheets-Sheet 2
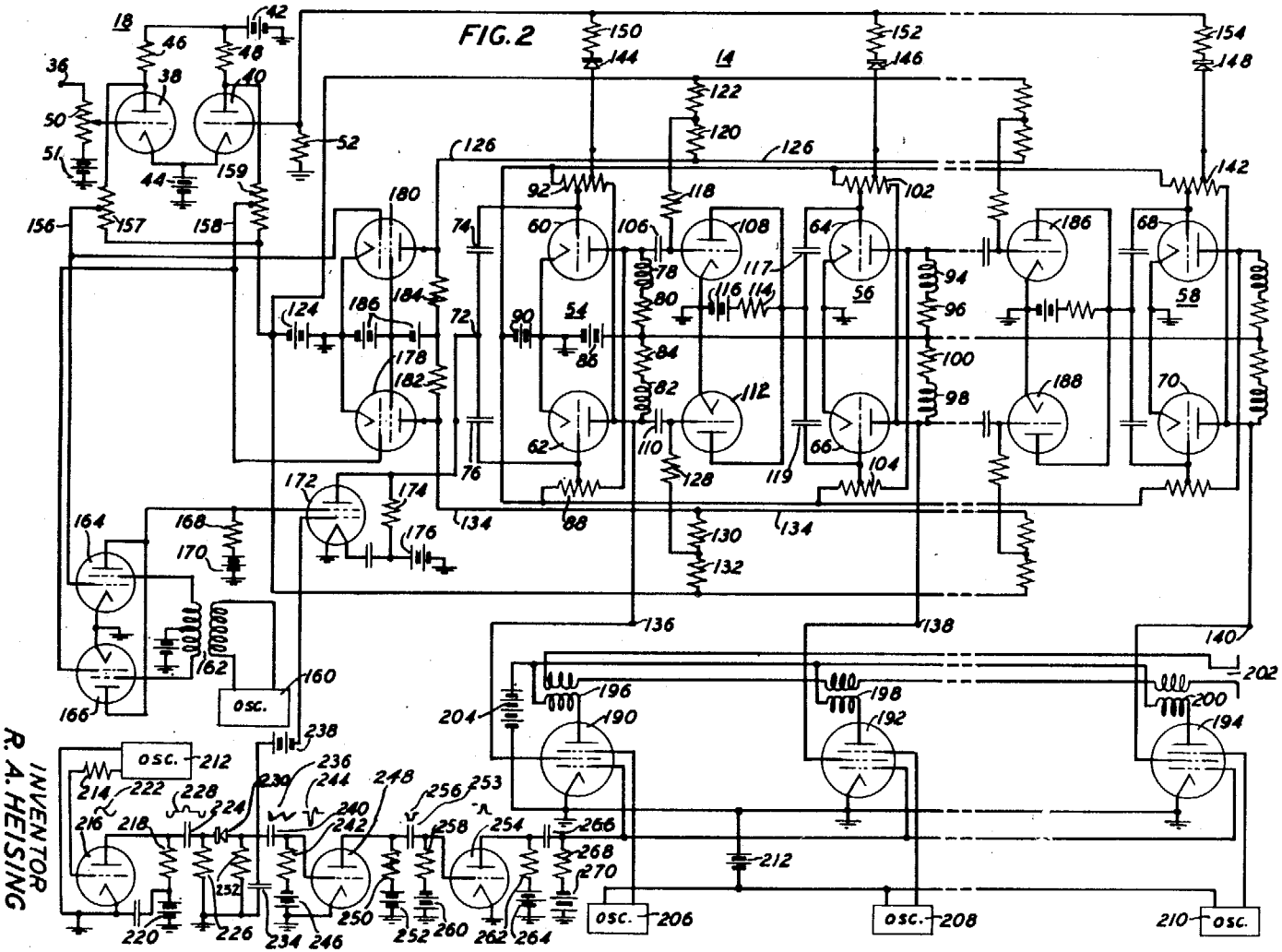
INVENTOR
R. A. HEISING
BY George C. Ford
ATTORNEY Reissued July 14, 1953

Re. 23,686

UNITED STATES PATENT OFFICE 23,686

COMMUNICATION SYSTEM

Raymond A. Heising, Summit, N. J., assignor to Bell Telephone Laboratories, Incorporated, New York, N. Y., a corporation of New York Original No. 2,539,623, dated January 30, 1951, Serial No. 727,973, February 12, 1947. Application for reissue December 29, 1951, Serial No. 264,110

11 Claims. (Cl. 332—11)

Figure 1:
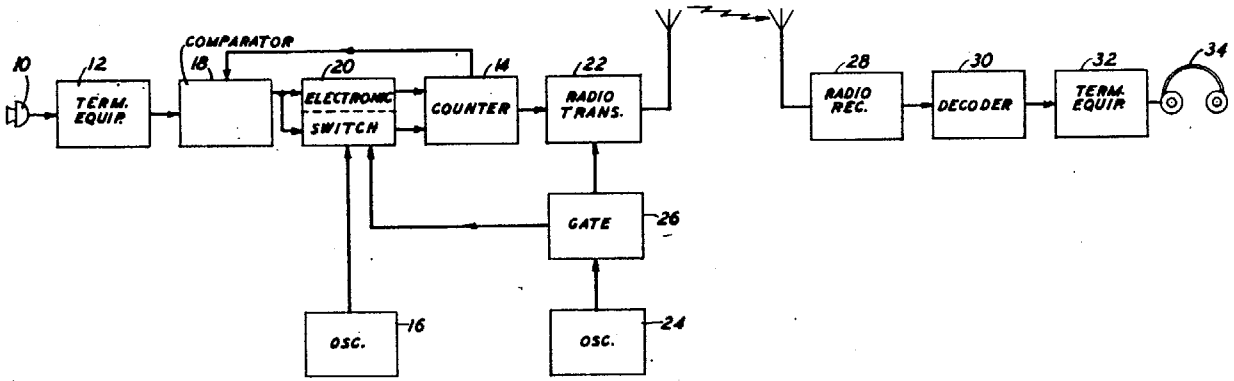

Matter enclosed in heavy brackets [ ] appears in the original patent but forms no part of this reissue specification; matter printed in italics indicates the additions made by reissue.

This invention relates to signaling or communication systems for the transmission of complex wave forms of the type present in speech, music, telegraph, picture and like signals by the process or method sometimes known as pulse code modulation.

In communication systems utilizing this type of transmission, a speech wave or other signal to be transmitted is sampled periodically to ascertain its instantaneous amplitude. The measured instantaneous amplitude is expressed by pulse codes analogous to telegraph codes.

One code which conveniently may be employed in pulse code transmission involves permutations of a fixed number of code elements each of which may have any one of several conditions or values. An advantageous code of this type is the so-called binary code in which each of the fixed number of code elements may have either of two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2^n$ where n is the number of code elements employed.

Because the total number of different amplitudes which may be represented by such a code of a fixed number of elements is limited, it is found desirable to divide the continuous range of amplitude values of which the transmittted signal is capable into a fixed number of constituent ranges which together encompass the total range. Each of these smaller or constituent amplitude ranges may then be treated as if it were a single amplitude instead of a range and *may be* [is] represented by an individual one of the permutations of the code. In the use of this method of code transmission the instantaneous amplitude ascertained by a sampling operation is represented by the respective permutation indicative of the amplitude range, or step, which most nearly approximates the amplitude of the measured sample. If, for example, the sample amplitude is nearest to that amplitude represented by the ninth step of the signal amplitude range the permutation code corresponding to range 9 is transmitted.

Communication systems based on the use of such codes have in general employed means for sampling the instantaneous amplitude of the complex wave to be transmitted at predetermined intervals, a coder to express the amplitude at the time of sampling in the form of a binary code group of a fixed number of code element voltages, means for transmitting the several voltages either simultaneously or successively to a receiver and means for decoding the transmitted code groups to recover the initial complex wave form. Such systems involve careful synchronization of the transmitter and the receiver as well as synchronization between the sampling and coding means which must operate in accurately timed relationship. In many cases the coder operates only intermittently, and in some instances must be reset between samples to prepare it for coding the next sample amplitude.

In other instances it is desirable, through application of well-known multiplex processes, to utilize a single transmission channel for the purpose of transmitting several complex wave forms. It has been usual in such cases to synchronize the transmission of a code group with the operation of the sampling and coding circuits required to produce that code group. Thus it has been necessary to switch a common sampler and coder from one signal input to another, utilizing a single sampler and a single coder to provide representative code groups for each of the signal channels therein. Such operation imposes severe requirements on the sampling and coding equipments which must complete their operation in the time allotted to a single channel.

It is an object of the invention to provide improved and simplified equipment for expressing the instantaneous amplitude of a complex wave form as a binary code group of voltages.

It is a further object of the present invention to provide a code modulation communication system in which operation of the coding means may be substantially continuous and independent of that of the transmitting and receiving equipment.

It is a still further object of the invention to provide a coder employing feedback to insure accurate representation of the complex wave to be transmitted.

In accordance with the above, the invention relates in one aspect to a communication system comprising a coder adapted for continuously representing the amplitude of a complex wave in binary code form and means for interrupting the operation of the coder momentarily to permit transmission of the code group present at that time to a remote station.

In another aspect the invention relates to a coder comprising a binary counter responsive to the instantaneous amplitude of a complex wave to be transmitted to produce code groups of voltages representative of the amplitude of that complex wave.

In another aspect the invention relates to a communication system for transmitting complex waves in which a code representing the complex wave is generated, the complex wave is regenerated from this code, the regenerated wave is compared with the original wave and finally the code is corrected in accordance with the comparison.

In other aspects the invention relates to a reversible binary counter and to the use of such a counter in the above-mentioned coder and to control means responsive to the amplitude of a complex wave to be transmitted for controlling the operation of such a counter.

The above and other objects and features of the invention will be better understood from a consideration of the accompanying detailed description of a specific embodiment taken in conjunction with the drawings in which:

Fig. 1 is a block diagram of a communication system in accordance with the invention; and Fig. 2 is a circuit schematic of the transmitting equipment shown in block form in Fig. 1.

Referring to Fig. 1 which shows an illustrative embodiment of the invention in block form, a complex wave form to be transmitted, shown here as derived from a microphone 10, is applied to terminal equipment 12. It will be understood that the system of the invention may be employed with equal benefit for the transmission of complex waves from other sources, as for example those from telegraphic, photographic or vibration-actuated devices, and those from television video channels, facsimile transmitters or the like.

Terminal equipment 12 may contain amplifiers, regulators, impedance transformers, etc. as necessary to convert the output of microphone 10 or any other source to a suitable power level. The signal appearing at the output of terminal equipment 12 comprising the complex wave form to be transmitted is superimposed upon a direct current bias voltage such that the signal will always be of the same polarity and is applied to apparatus for expressing the instantaneous amplitude of the complex wave form as a binary code group of signals. This apparatus includes a counter 14, an oscillator 16 adapted to drive the counter, a comparator 18 and an electronic switch 20 arranged to control the operation of counter 14.

Counter 14, which is arranged to measure in arbitrary units the instantaneous amplitude of the complex wave to be transmitted, comprises a multistage binary counting circuit. Each stage of this circuit has two conditions of stability, only one of which may exist at a time. The counter is formed by connecting these stages together in such a way that any stage is switched from one of its conditions of stability to the other only when the next preceding stage has been switched from one condition of stability to the other by one impulse and subsequently switched back to the original condition of stability by a second impulse. In other words two switching operations of any stage are required to produce a single switching operation of the following stage. Thus each stage may be assigned to represent one of the denominational orders or positions of a binary number, the two conditions of stability of the stage corresponding respectively to the zero and the one of that order of the binary number. Then, if means are provided for each stage to produce a signal voltage indicative of the condition of stability occupied by that stage, a binary code representation of the number of impulses applied to the input or first stage of the counting circuit may be obtained.

Counter 14 is controlled by comparator 18 acting through electronic switch 20. Comparator 18 effectively controls the application of impulses generated in oscillator 16 to counter 14 in such fashion that the number of impulses applied is proportional to the instantaneous amplitude of the complex wave to be transmitted. For this purpose means are included in counter 14 for producing a voltage the amplitude of which is representative of the number of impulses which have been applied to and counted by the counter. This voltage is compared in comparator 18 with a voltage proportional to the instantaneous amplitude of a complex wave to be transmitted. If the voltage representing the amplitude of the complex wave is larger than that representing the number of impulses counted by counter 14, electronic switch 20 completes a circuit from oscillator 16 to the counter causing it to operate until the two voltages applied to comparator 18 are equal.

Since the instantaneous amplitude of the complex wave to be transmitted may either increase or decrease, means are incorporated in the counter to permit reversal of the counting direction depending upon whether the voltage representing the complex wave or that representing the output of the counter is the larger. This reversing means is controlled by another section of electronic switch 20 in response to the output of comparator 18 and conditions counter 14 to count upwardly as the instantaneous amplitude of the complex wave increases and to reverse its counting direction and count downwardly as the intantaneous amplitude of a complex wave decreases.

As pointed out above, counter 14 provides an individual output signal for each stage and each output signal may have either of two values indicating which of the two conditions of stability is occupied by the stage of the counter from which it is derived. The several output signals taken together form a binary code representation of the number of impulses counted and thus of the instantaneous amplitude of the complex wave applied through terminal equipment 12. These output signals are applied individually to a radio transmitter 22 capable of producing a different subchannel carrier frequency for each of the counter output signals, one carrier being controlled by each of the counter output voltages. At predetermined instants, fixed in the case of this illustrative embodiment by timing oscillator 24, a gating or timing system 26 interrupts the action of the coding system and renders the transmitter operative to radiate simultaneously all subchannel carriers which have been enabled.

At the receiving end of the system, the radiated signals are received by radio receiver 28 and the demodulated output of that receiver is applied to a decoder 30. This decoder operates in response to the transmitted binary code groups to reconstruct the complex wave form represented thereby and its output is applied to terminal equipment 32 which comprises the necessary amplifiers, filters and impedance changing devices required to produce an output suitable for application to headphones 34 or any other output device which it may be desired to employ.

Circuit details of illustrative transmitting equipment in accordance with the invention are given in Fig. 2 to which reference is now made. The complex wave signal appearing at the output of terminal equipment 12 in Fig. 1 is applied through terminal 36 and potentiometer 50 to a comparator indicated at 18 and comprising vacuum tubes 38 and 40 together with plate and bias batteries 42 and 44, respectively, and load resistors 46 and 48. Potentiometer 50 is connected to ground through a bias battery 51 by means of which a direct current bias voltage is added to the complex wave signal at the output of the terminal equipment. This bias voltage has an amplitude which is at least equal to one-half the maximum peak-to-peak amplitude to be accepted by the coding circuits. Thus all signals applied to the coding circuits will be of one polarity. Assuming for example and as shown that the bias voltage is positive, and is equal to one-half the peak-to-peak signal accepted by the coding circuits, then the maximum signal amplitude applied to the grid of comparator tube 38 will be equal to the full amplitude which can be accommodated whenever the complex wave signal reaches its peak positive value. On the other hand, the signal applied to tube 38 of the comparator will be substantially zero when the complex wave signal reaches its peak negative amplitude. Accordingly, tube 38 is never cut off and will operate at the approximate center of its range when no complex wave signal is applied (or when the complex wave amplitude is zero). The significance of this condition will appear below.

The signal voltage appearing across potentiometer 50 is applied to the control grid of vacuum tube 38 as stated above while a potential derived from counter 14 and appearing across resistor 52 is applied to the control grid of vacuum tube 40. The potential applied to the comparator from the counter is derived therefrom in a manner which will be described hereinafter and is proportional in amplitude to that represented by the binary code group appearing at the output of the counter. Comparator 18 controls the operation of counter 14 through electronic switching circuits to determine when and in which direction the counter shall operate.

Counter 14 comprises an impulse counting circuit and certain auxiliary circuits permitting reversal of the counting direction thereof. The counting circuit comprises a plurality of stages each of which may include a switching circuit of the type sometimes referred to as a "flip-flop" circuit and having two mutually exclusive conditions of stability. Three such counting stages 54, 56 and 58 are shown in Fig. 2 representing the first, second and nth stages of a n-stage counter. The dotted connections in Fig. 2 indicate the location of additional intermediate stages which are identical to stage 56 as shown. It should be understood that the number of counting stages employed depends in any particular instance, upon the range of amplitude desired to be accommodated by the transmission system and upon the required fidelity of transmission. If, for example, three stages are employed each having two conditions of stability, the possible number of unique permutations among the operating conditions obtainable by switching the three counting stages individually from one condition of stability to another amounts to $2^3$ or 8. Similarly the use of five counting stages results in an increase in the number of possible permutations to $2^5$ or 32. The n-stage counter forming a portion of the coder of Fig. 2 accordingly permits expression of $2^n$ permutation values.

Each of the counting stages 54, 56 and 58 comprises a pair of vacuum tubes 60 and 62, 64 and 66, and 68 and 70 respectively. Considering the first of these identical counting stages, impulses appearing at terminal 72 are applied through capacitors 74 and 76 to the control grids of vacuum tubes 60 and 62, respectively. The cathodes of tubes 60 and 62 are connected together and to ground while the plates thereof are connected respectively through inductor 78 and load resistor 80 in series and inductor 82 and load resistor 84 in series to the positive terminal of battery 86, the negative terminal of which is grounded. The plate of tube 60 is connected through tapped resistor 88 to the negative terminal of bias battery 90, the positive terminal of which is grounded while the plate of tube 62 is connected through tapped resistor 92 to the negative terminal of bias battery 90. The control grids of tubes 60 and 62 are connected respectively to the taps of resistors 92 and 88. Thus a portion of the potential appearing at the plate of tube 60 is applied to the control grid of tube 62 and similarly a portion of the potential appearing at the plate of tube 62 is applied to the control grid of tube 60.

The circuit arrangement including vacuum tubes 60 and 62 and the associated circuit components and sources of potential is stable with current flowing in either one but not both of the tubes. Thus if it be assumed initially that current is flowing through tube 62, tube 60 is cut off and the operation of the circuit may be considered as follows. When current is flowing through tube 62 the plate potential thereof will be lower than that of tube 60 because of potential drop in resistor 84 while no potential appears across resistor 80 as there is no current in tube 60. Since the grid of tube 60 has a connection to the plate of tube 62 through resistor 92, this grid is maintained sufficiently negative to prevent current flow through tube 60. Since no current is flowing in tube 60 the plate potential thereof is high and this potential applied to the grid of tube 62 through resistor 88 maintains the potential of the grid of tube 62 at a suitable point to permit current flow through that tube. If now a negative impulse is applied through terminal 72 and capacitors 74 and 76 to the control grids of vacuum tubes 60 and 62 the following action occurs. Since tube 60 is already cut off the negative impulse applied to the grid thereof has no direct effect. On the other hand the negative impulse applied to the control grid of tube 62 tends to cut off the plate current in that tube and correspondingly increase the plate potential thereof. The diminution of current in tube 62 causes the potential drop across resistor 84 to disappear and allow the potential at the plate of tube 62 to approach that of the plate of tube 60 and in addition the falling current in tube 62 causes inductance coil 82 in the plate circuit to produce an additional potential change, acting to raise the potential of the plate of tube 62 well above that of the plate of tube 60. Then due to the connection between the plate of tube 62 and the grid of tube 60, the potential of the grid of tube 60 is increased sufficiently to start current flowing in this tube. As the plate current begins to flow in tube 60, a reduction of its plate potential results, reducing further the voltage on the grid of tube 62 to maintain that tube cut off. The current flow is thus switched from tube 62 to tube 60 and the circuit is shifted from one of its conditions of stability in which tube 62 conducts while tube 60 is cut off to the other in which the reverse situation obtains.

If a second negative impulse is applied through capacitors 74 and 76 to the control grids of the two tubes a similar process occurs. Plate current through tube 60 is cut off. The energy stored in inductor 78 is sufficient to cause initiation of plate current flow in tube 62 returning the flip-flop circuit to the initially assumed condition of stability. Thus it will be seen that for each pair of negative impulses applied to counting stage 54 the flip-flop circuit shifts from one condition of stability to the other and then shifts back to its original condition completing a counting cycle.

For purposes of discussion, it is convenient to designate the two conditions of stability of such flip-flop circuits as the "off" and "on" states, calling the tube which is conducting in the first of these states the "off" tube and that which is conducting in the second the "on" tube. If it is assumed that when current flows in tube 62, counter stage 54 is in the "off" state, tube 62 is the "off" tube and tube 60 is the "on" tube. This convention will be followed hereinafter in referring to the tubes of the counter circuit.

The circuit arrangement of counting stage 56 is identical to that of counting stage 54, positive potential from battery 86 being applied to the plates of vacuum tubes 64 and 66 through load circuits including respectively inductor 94, resistor 96 and inductor 98, resistor 100. Likewise the plate of tube 66 is connected through tapped resistor 102 to the negative terminal of bias battery 90 and the plate of tube 64 is connected through tapped resistor 104 to the same point. The grids of vacuum tubes 64 and 66 respectively are connected to the taps on resistors 102 and 104 and impulses may be applied to these grids through capacitors 117 and 119 which correspond to capacitors 74 and 76 of counting stage 54. As in the case of the counting stage described above, counting stage 56 has two conditions of stability and the current flow is shifted from one of the tubes to the other by the application of a negative impulse through capacitors 117 and 119 to the grids of the two tubes. As in counting stage 54 two negative impulses must be applied successively to the grids to cause one complete counting cycle. Conforming to the convention chosen above, tube 66 of the counting stage 56 will be designated the "off" tube and tube 64 the "on" tube.

The interstage connections which control the direction of counting will now be considered. In Fig. 2 the plate of "on" tube 60 of counter stage 54 is connected through capacitor 106 to the control grid of vacuum tube 108 while the plate of "off" tube 62 is similarly connected through capacitor 110 to the control grid of vacuum tube 112. The plates of vacuum tubes 108 and 112 are connected together and through resistor 114 to the positive terminal of battery 116, the negative terminal of which is grounded. The grid of tube 108 is connected through series resistor 118 to the junction of voltage divider resistors 120 and 122 which are connected in series between the negative terminal of battery 124 and control lead 126. Similarly the control grid of tube 112 is connected through resistor 128 to the junction of resistors 130 and 132 connected in series between the negative terminal of battery 124 and control lead 134.

The negative voltage from bias battery 124 is made sufficient to maintain both interstage tubes 108 and 112 cut off in the presence of the largest possible potential difference between control leads 126 and 134. If, however, one of the control leads, 126 for example, is at a higher potential than the other control lead 134, tube 108 will be biased just below cut-off by the joint action of the bias voltage from battery 124 and that on control lead 126 while tube 112 will be driven far below cut-off.

Let it be assumed that control lead 126 is positive with respect to control lead 134 and that interstage tube 108 is operating just below cut-off with tube 112 far beyond cut-off and that counting stages 54 and 56 are in the "off" condition with "off" tubes 62 and 66 conducting and "on" tubes 60 and 64 cut off. If a negative impulse is applied through terminal 72 and capacitors 74 and 76 respectively to the control grids of tubes 60 and 62, current flow will shift from "off" tube 62 to "on" tube 60 as has been explained above. Thus the plate voltage of "off" tube 62 increases while that of "on" tube 60 decreases.

Since interstage tube 112 is biased far below cut-off, the increase of voltage at the plate of "off" tube 62 has no effect on the operation of tube 112. Similarly, the drop in plate voltage of "on" tube occasioned by the initiation of current flow therethrough has no effect on the operation of tube 108 which is already cut off as stated above.

If a second impulse is now applied to the grids of vacuum tubes 60 and 62 of counting stage 54, this stage is returned to its initially assumed "off" condition with current flow shifted back from "on" tube 60 to "off" tube 62. As "off" tube 62 again becomes conductive its plate voltage drops but this voltage drop, applied to the grid of interstage tube 112 has no effect because this tube is already biased far beyond cut-off.

On the other hand, the increase in plate voltage brought about by the return of "on" tube 60 to the cut-off condition and applied through capacitor 106 to interstage tube 108 is sufficient to cause the flow of plate current through this tube which, it will be recalled, was assumed to be biased just below cut-off by the potential across voltage divider resistor 120. The increase in plate current in tube 108 causes a corresponding drop in plate voltage and thus in the voltage applied through capacitors 117 and 119 to the grids of vacuum tubes 64 and 66, respectively, of counter stage 56. This drop in plate voltage corresponds to a negative pulse and is effective to shift the flow of current in counter stage 56 from "off" tube 66 to "on" tube 64.

Thus it will be seen that two negative impulses must be applied at terminal 72 to produce one shift in current flow in counter stage 56 and that by the same analysis four negative impulses must be applied to terminal 72 to produce a full counting cycle of counting stage 56, shifting the flow of current from the "off" tube 66 to the "on" tube 64 upon the second impulse and back to the "off" tube 66 upon the fourth count.

As shown in Fig. 2 the plates of "off" tubes 62, 66 and 70 of the first, second and *n*th counter stages 54, 56 and 58 are connected respectively to counter output terminals 136, 138 and 140. In the operation of the counter in the manner described above, it is seen that upon the application of a single negative impulse under the initial conditions assumed above with current flowing in "off" tubes 62, 66 and 70, the voltage at terminal 136 is increased to a value greater than that initially present. Thus increased output voltage is present at terminal 136 while that at terminal 138 remains at the initial value. Thus the voltages on terminals 138 and 136 in that order may represent the binary number 01, corresponding to a count of one impulse. Upon receipt of a second negative impulse counter stage 54 returns to its initial condition completing a full cycle with the current flow again through "off" tube 62, and applying a single negative impulse to counter stage 56 to shift the flow of current therein from "off" tube 66 to "on" tube 64. Thus the voltage at terminal 136 is reduced and an increase in output voltage appears at terminal 138. In this instance the binary number obtained on terminals 138, 136 in that order is 10 corresponding to a count of two.

A third impulse applied at terminal 72 again switches counter stage 54 to the "on" condition (as contrasted with the initially occupied "off" condition) and the flow of current is again switched from "off" tube 62 to "on" tube 60. Accordingly, the plate voltage of "off" tube 62 increases and the voltage appearing at output terminal 136 is increased signifying operation of the stage. Since the third impulse causes only one-half cycle of operation of counter stage 54 no negative impulse is applied to counter stage 56 and it remains in the "on" condition to which it was switched by the second impulse. Thus after three impulses signal voltages appear at both terminals 138 and 136 indicating a binary number 11 corresponding to the number 3.

Additional stages of the counter, as for example a third counter stage inserted with interstage tubes at the location of the dashed lines of Fig. 2, operate in an entirely analogous manner. Thus, if the current in the third stage is initially through the "off" tube, the third counter stage remains in its initial "off" condition in which the current flow is through the "off" tube. Upon the application of a fourth impulse at terminal 72, however, counter stage 54 returns to the unoperated condition removing the output voltage from terminal 136 and at the same time applying a negative impulse to counter stage 56. This impulse serves to switch counter stage 56 from the "on" condition of stability which it occupies at the conclusion of the third impulse to the "off" condition removing the signal potential from terminal 138 and at the same time applying a negative impulse to the third counter stage. This negative impulse switches the flow of current from the "off" tube of this stage to the "on" tube and the increase in [late] *plate* potential of the "off" tube produced by this action may appear at an output terminal connected to the plate of the "off" tube as an output signal indicative of the operation of this stage.

The operation of three counter stages in counting four impulses may be summarized in a table as below:

| Decimal No. | Binary No. | Third Counter Stage | Second Counter Stage | First Counter Stage |
|---|---|---|---|---|
| 1 | 001 | off | off | on |
| 2 | 010 | off | on | off |
| 3 | 011 | off | on | on |
| 4 | 100 | on | off | off |

Let it now be assumed that after the counter has reached a count of three with current flow in "on" tubes 60 and 64 and increased output voltages appearing at both terminals 138 and 136, the potential between control leads 126 and 134 is reversed in polarity, as would be the case if the complex wave amplitude were to decrease. As a result of such reversal of control potential, interstage tube 108 is carried well below cut-off while the bias on interstage tube 112 is increased until that tube is just below cut-off. If such adjustments in the operation of the interstage tubes are made by means which will be considered hereinafter, the counter comprising counting stages 54, 56 and 58 may be caused to reverse and count downwardly in response to the application of further negative impulses at terminal 72. If, for example, after the counter has reached an indication of the decimal value 3 as described above and the interstage connections have been readjusted as just assumed, a negative impulse is applied at terminal 72, the following action occurs.

The negative impulse applied at terminal 72 switches the current flow in counter stage 54 from "on" tube 60 to "off" tube 62 placing this stage in its "off" condition with the result that an increase in potential appears at output terminal 136. This switch in current flow results in an increase in the plate potential of "on" tube 60 and a decrease in plate potential of "off" tube 62. Since interstage tube 108 is far below cut-off, the increase of plate voltage of "on" tube 60 will be of no effect. Also, since tube 112 is still cut off though now operating just below cut-off, the decrease of plate voltage of "off" tube 62 will not cause any current flow in tube 112. Consequently, the potential at output terminal 138 will remain high while that at terminal 136 is reduced to its lower value and the binary number on these terminals will be 10, corresponding to the count of two.

Upon application of another negative impulse at terminal 72 (the second impulse after reversal of the control potential), current flow in counter stage 54 is again switched, it being transferred from "off" tube 62 to "on" tube 60. The resultant decrease in the plate voltage of "on" tube 62 has no further effect since interstage tube 108 is cut off. The increase in plate voltage of "off" tube 62, however, is sufficient to cause current flow in interstage tube 112 with a resultant drop in the plate voltage thereof. Accordingly, a negative impulse is applied through capacitors 117 and 119 to the grids of tubes 64 and 66 in counter stage 56. Thus current flow for counter stage 56, which was in "on" tube 64 at the counts of two and three, is shifted to "off" tube 66 with a resultant decrease in output potential at terminal 138. The binary number on output terminals 138 and 136 is then made 01 corresponding to a count of one.

From the above it will be seen that the direction of counting may be reversed and the counter caused to count downwardly by reversing the potential on control leads 126 and 134. While the above consideration has been confined to the two counting stages 54 and 56, it will be apparent that a counter with any desired number of stages may be caused to operate in the same fashion through employment of interstage circuits similar to that shown between stages 54 and 56, between each pair of stages.

In the above it has been assumed that means were available for turning the counter on and off and for controlling the direction of counting by adjusting the potential between control leads 126 and 134. Comparator 18 performs these functions by comparing a voltage proportional to the instantaneous amplitude of the complex wave (plus the bias from battery 51) applied to input terminal 36 (Fig. 2) with a potential which has been defined above as being proportional to the number of impulses indicated as counted by the binary number appearing on the output terminals of the counter. This potential is derived from the counter in the following manner. Plate-grid resistors 92, 102 and 142 of counter stages 54, 56 and 58 respectively are tapped and the taps are connected through rectifiers 144, 146 and 148 respectively and series resistors 150, 152 and 154 respectively to the grid of vacuum tube 40 which forms a part of comparator 18.

The locations of the taps on resistors 92, 102 and 142 are so chosen that when the respective counter stages are in the "off" condition with current flowing in the "off" tubes, the potentials derived therefrom are slightly below ground potential, the negative potential furnished by bias battery 90 being sufficient to overcome the relatively low positive potentials at the plates of the "off" tubes during the time these tubes are conducting. Under these conditions rectifiers 144, 146 and 148 effectively prevent any potential from appearing across resistor 52 and being applied to the control grid of triode 40.

If for example, counting stage 54 is switched to the "on" condition, the plate potential of "off" tube 62 and consequently the voltage at the tap of resistor 92 will rise and current will flow through rectifier 144, resistor 150 and resistor 52. Resistor 150 is so proportioned that the drop across resistor 52 in response to such current flow is proportional to the amplitude portion represented by operation of counting stage 54. Thus by way of example, resistor 150 may have such an ohmic value that 0.1 volt is developed across resistor 52 when counting stage 54 is switched to its "on" condition denoting a count of one.

The circuits including rectifier 146-resistor 152 and rectifier 148-resistor 154 operate in the same manner when the stages with which they are associated are switched to the "on" condition of stability. In the case of stage 56, however, resistor 152 is so proportioned that the flow of current through resistor 52 occasioned by operation of counting stage 56 is proportional to the amplitude increment of 2 represented by operation of that stage. If the potential drop across resistor 52 in response to the operation of counter stage 54 is made 0.1 volt as suggested by way of example above, the drop across this resistor produced by operation of counter stage 56 must then be 0.2 volt. Similarly, the drop across resistor 52 produced by operation of the *n*th counting stage 58 must be proportional to the increment of amplitude represented by operation of that stage or [$0.1\times2^n$] $0.1 \times 2^{n-1}$ volts. Voltages developed across resistor 52 upon the operation of additional stages must, of course, be proportional in the same way to the amplitudes represented by operation of the stages. It will be understood that the voltages developed across resistor 52 by the circuits considered above need not be respectively 0.1, 0.2 . . . [$0.1\times2^n$] $0.1 \times 2^{n-1}$ volts, but may have any values in the same proportion so long as the current flowing in resistor 51 in response to operation of the counting stage representing the largest amplitude increment does not disturb the current flowing in that resistor from the counting stage representing the smallest increment beyond an amount which would interfere with the operation of the system with the fidelity required for a particular application.

From the above it will appear that the voltage developed across resistor 52 and applied to the control grid of triode 40 is proportional to the amplitude of the counting sum appearing as a binary number on counter output terminals 136, 138 . . . 140.

It will be recalled that battery 51 in series with potentiometer 50 in the grid circuit of comparator tube 38 is effective to add a steady bias voltage to the complex wave applied at terminal 36. Conveniently the bias voltage so added is positive and equal to one-half the peak-to-peak amplitude of the largest complex wave to be accepted by the coder. Thus all complex wave amplitudes applied to the grid of comparator tube 38 will be positive and the signal applied thereto for zero complex wave input at terminal 36 will be substantially one-half the total range acceptable by the coder.

If, for example, the maximum peak-to-peak amplitude is A, the bias voltage from battery 51 may be a which is equal to ½ A. Then, measured [in] *with* respect to ground, the complex wave as applied to the grid of comparator tube 38 will have a range of values extending from 0 to 2a and all such values will be positive [in] *with* respect to ground. If potentiometer 50 in the grid circuit of comparator tube 38 is so adjusted that the voltage applied to the grid of this tube for a given instantaneous complex wave amplitude, measured with the superimposed bias, is equal to that developed across resistor 52 when the counting sum has an amplitude equal to the instantaneous amplitude of the complex wave in arbitrary units, it will be seen that the instantaneous amplitude of the complex wave may be continuously compared with the counting sum appearing on terminals 136 through 140 of the impulse counter. Such comparison is made by tubes 38 and 40, the plate potentials of which vary respectively and inversely as the complex wave amplitude applied through potentiometer 50 and measured as set forth above and the counting sum amplitude applied through resistor 52. Thus if the amplitude of the complex wave at any instant exceeds that indicated by the counter, the plate potential of tube 38 will be less than that of tube 40 and a potential difference will exist between leads 156 and 158 connected respectively to the taps of resistors 157 and 159 which are connected between the plates of tubes 38 and 40, respectively and the negative terminal of bias battery 124. Similarly a potential difference of the opposite polarity will occur when the amplitude of the complex wave is less than that of the counting sum output of the counter. These differences in potential are employed to turn the counter on whenever the two values are unequal and to determine the direction in which the counter is to operate or count.

In the foregoing it has been assumed that negative impulses have been applied to terminal 72 of the counting circuit without reference to the source of these impulses. In the illustrative system of Fig. 2 such impulses are derived from an oscillator 160, the frequency of which must be sufficient to permit operation of the counter over its entire counting range with enough speed to permit accurate representation of all frequency components of the complex wave form desired to be transmitted. For example, oscillator 160 which may be of any conventional type may have a frequency of 500,000 or 600,000 cycles per second. Its output is coupled through transformer 162 to a pair of control tubes 164 and 166 shown herein as tetrodes. The secondary winding of the transformer is center tapped and the push-pull signal developed in this winding is applied to the screen grids of the two control tubes. The cathodes of these two tubes are connected together and to ground while the plates are connected through a common load resistor 168 to the positive terminal of battery 170, the negative terminal of which is grounded. Resistors 157 and 159 connected to the plates of comparator tubes 38 and 40, respectively are tapped to provide suitable potentials for application to the control grids of counter control tubes 164 and 166.

If the amplitude of the counter sum output is equal to the instantaneous amplitude of the complex wave to be transmitted, as measured from ground after the addition of the bias voltage from battery 51, no potential difference appears between comparator output leads 156 and 158 and the control grids of tubes 164 and 166 are held at equal potentials. Accordingly, the oscillator signal applied in push-pull to the screen grids of these tubes is canceled out in the plate circuit and no alternating current output is produced. If on the other hand, a potential difference of either polarity occurs between the output leads from comparator tubes 38 and 40 in response to a disparity between the instantaneous amplitude of the complex wave to be transmitted, measured as above, and the amplitude of the sum output of the counter, the current through one of control tubes 164 and 166 will exceed that through the other and an alternating current component will appear across plate resistor 168.

The potential developed across plate resistor 168 of counter control tubes 164 and 166 is applied to the screen grid of a switching or gating tube 172 having at least two grids. The cathode of this tube, which is shown as a tetrode, is grounded and the plate is connected through load resistor 174 to the positive terminal of battery 176, the negative terminal of which is grounded. It will be assumed for the purpose of the present consideration that the potential applied to the control grid of switching tube 172 is such as to permit conduction of current therethrough whenever the voltages applied to the plate and screen grid have suitable values. It will be noted that the screen grid of switching tube 172 is connected directly to the plates of counter control tubes 164 and 166. Accordingly, a positive voltage of varying amplitude is appplied to the screen grid of switching tube 172. This voltage is so chosen in relation to the other voltages applied to tube 172 (by variation of the potential of battery 170 or load resistor 168) that this tube is rendered conductive only when the sinusoidal plate signal across resistor 168 reaches a positive peak and the voltage on its control grid is simultaneously great enough to permit the flow of current. Thus, if the voltage applied to the control grid of switching tube 172 is suitable and if, because the sum output of the counter is not representative of the instantaneous amplitude of the complex wave to be transmitted, a sinusoidal voltage appears across load resistor 168, switching tube 172 will pass plate current for each positive peak of the applied sinusoidal voltage. Accordingly, a series of negative pulses are developed across resistor 174 whenever the counter output is not representative of the complex wave amplitude. These negative pulses are applied at terminal 72 to the first stage of the counter, resistors 88 and 92 and capacitors 74 and 76, respectively being proportioned to differentiate and thus sharpen the negative pulses applied to counting tubes 60 and 62.

The circuits thus far described illustrate the manner in which the counter is turned on or off depending upon whether or not the sum indicated thereby is representative of the amplitude of the complex wave to be transmitted. Means for controlling the direction of counting of the counting circuit will now be considered. For this purpose the potential difference existing between comparator output leads 156 and 158 is amplified and applied to control leads 126 and 134 to control interstage tubes 108, 112, etc. In Fig. 2 the amplifier is shown as comprising vacuum tubes 178 and 180 but a multistage amplifier may be employed, the principal requirement being that when the counter sum differs from the complex wave amplitude by an amount equal to a count of one unit, the voltage developed between control leads 126 and 134 must be sufficient to apply the proper bias to the interstage tubes as considered above. The cathodes of tubes 178 and 180 of the amplifier shown in Fig. 2 are connected together and to ground while the plates thereof are connected through load resistors 182 and 184 respectively to the positive terminal of tapped battery 186, the negative terminal of which is connected to ground. The screen grids of these tubes 178, 180 are connected together and to the tap of battery 186 while the control grids are connected respectively to the taps on comparator output resistors 159 and 157. In Fig. 2 the grids of amplifier tubes 178 and 180 have been shown as connected to the same taps on resistors 159 and 157 as the grids of control tubes 166 and 164. It will be understood, of course, that these two sets of connections need not be made to the same taps and may be varied as desired to obtain the proper potentials for application to the grids of the control and amplifying tubes.

In considering the operation of the counter directional control circuit, let it be assumed that the counting sum voltage appearing across resistor 52 is less than the instantaneous amplitude of the complex wave to be transmitted, measured with respect to ground and applied to the grid of comparator tube 38. Under these conditions the plate current in tube 38 exceeds that in tube 40 and as a result, the plate voltage of tube 38 drops below that of tube 40. Accordingly, the voltage applied to the grid of amplifier tube 180 is less than that applied to amplifier tube 178. As a result, the plate current in amplifier tube 180 is less than that in amplifier tube 178 and the plate potential of amplifier tube 180, and thus the potential on control lead 126, is higher than the plate potential of amplifier tube 178 and thus the potential on control lead 134. Then the interstage tubes 108, 186, etc. are biased just below cut-off and can pass positive-pulses from the "on" counter tubes, while interstage tubes 112, 188, etc. are biased far below cut-off and effectively open the interstage circuits between the "off" tubes of the counter. Thus the counter will count upwardly as has been described above, tending to increase the counting sum and thus to balance the comparator control circuit.

In a similar fashion, the counting direction of the counter is reversed whenever the sum output voltage appearing across resistor 52 exceeds the complex wave amplitude as measured from ground after imposition of the bias from battery 51. Because of the bias from battery 51 the counter will rest at the approximate middle of its range whenever the complex wave applied at terminal 36 is of zero amplitude. As the complex wave at this point becomes more positive, the counter will count upwardly and as the applied complex wave becomes negative (at terminal 36) the counter will reverse and count downwardly.

From a consideration of the circuit arrangements described above, it will be seen that the potentials appearing at counter terminals 140 . . ., 138 and 136, taken in the order given, form a binary code group representative of the instantaneous amplitude of the complex wave applied at terminal 36 from terminal equipment 12. This binary code group changes continuously so that it is maintained at all times representative of the instantaneous amplitude of the complex wave as that amplitude increases and decreases.

The potentials at terminals 140 . . ., 138 and 136 may be transmitted to a remote station by a variety of means. For example, individual transmission subchannels each comprising a separate wire transmission line might be provided or known methods of multiplex may be employed. Conveniently and as shown in the embodiment illustrated in Fig. 2 means are provided for transmitting the code group formed by these output potentials over a radio transmission link comprising a separate subchannel for each of the counter stage output voltages. Because of the requirements of the particular receiver with which the exemplary system described herein is designed to operate, means are provided to render this radio transmission link operative only at predetermined times, during which times the coder is momentarily stopped to permit transmission of a fixed binary code group to the receiving station. In other cases it may be desirable, depending upon the receiver employed, to operate both the coder and transmitter continuously or to operate the receiver periodically interrupting the coder during the transmitting intervals as in the exemplary system.

The radio transmitter of the exemplary system comprises power amplifier tubes 190, 192 and 194, which may be of the pentode type, associated respectively with counter stages 54, 56 and 58. The cathodes of power amplifier tubes 190, 192 and 194 are connected together and to ground while their plates are respectively connected through transformers 196, 198 and 200 to a dipole antenna 202, plate potential for the tubes being applied from battery 204 through the primary windings of these transformers. Associated with the power amplifier tubes 190, 192 and 194 are radio frequency oscillators 206, 208 and 210, respectively. If additional counting stages are employed, additional amplifiers and oscillators must be provided, one oscillator and one amplifier being associated with each counting stage as shown in Fig. 2. The oscillators are tuned to different radio frequencies and their outputs are applied to the suppressor grids of the associated amplifier tubes superimposed upon a bias voltage derived from battery 212. The counter output voltages from counter terminals 136, 138 and 140 are applied respectively to the screen grids of amplifier tubes 190, 192 and 194. If a suitable potential is applied to the control grids of amplifier tubes 190, 192 and 194, the radio frequency signals generated by the oscillators, respectively associated with these amplifier tubes will be applied to the antenna whenever the counter stage associated with a particular amplifier tube is in its "on" condition. When a counter stage is in its "off" condition, the potential appearing at its output and applied to the screen grid of the associated amplifier tube is insufficient to permit conduction.

The radio transmitter is turned on and the operation of the counter interrupted momentarily by means of a timing circuit to permit the transmission of a code group representation of the instantaneous amplitude of the complex wave. In the exemplary embodiment described and illustrated herein the transmitting process is made to occur periodically under the control of an oscillator 212 which may be any conventional oscillator capable of producing a sinusoidal output signal of relatively constant frequency. If aperiodic transmission is desired a device capable of producing impulses at random intervals may be substituted for the oscillator. One such device may include means for amplifying a random noise potential and clipping it to produce a series of irregularly spaced impulses suitable for the operation of the timer.

In the present embodiment in which transmissions occur at regular intervals oscillator 212 may conveniently have an operating frequency of approximately 8,000 cycles per second. At this frequency at least two code groups will be transmitted for all frequency components of the complex wave to be transmitted having frequencies equal to or less than 4,000 cycles per second. If it is desired to transmit higher frequency components the oscillator frequency must necessarily be increased, and this may be done without substantial limitation so long as the counter is capable of sufficiently rapid operation to permit counting of the full amplitude range between the times of transmission. Since the counter operates reversibly and continuously measures the instantaneous amplitude of a complex wave to be transmitted, it is not necessary to allow any time for resetting the counter. Accordingly, for a given counter speed, higher frequency components may be transmitted over the system of the invention than over those previously known.

Returning now to the illustrative embodiment shown in Fig. 2, the sine wave output of oscillator 212 is supplied through series resistor 214 to the control grid of a vacuum tube 216. The cathode of this tube, which may conveniently but not necessarily be a triode, is grounded while the plate is connected through load resistor 218 to the positive terminal of battery 220, the negative terminal of which is connected to ground. Series resistor 214 in the grid circuit of this tube tends to flatten the sine wave and produces a signal across load resistor 218 having a wave form of the type shown at 222. This signal is applied to a circuit comprising resistor 226 and capacitor 224 which are of such values that the signal is differentiated, producing a wave form of the type shown at 228. The positive portions of this differentiated signal are eliminated by rectifier 230 through which the signal is impressed upon resistor 232 and capacitor 234 connected in parallel. The negative portions produce charges on capacitor 234 that are discharged relatively slowly through resistor 232. The resultant negative saw-tooth pulses 236 are impressed through bias battery 238 upon the control grid of switching tube 172. Bias battery 238 is of a value to permit current flow through switching tube 172 and each of the negative peaks of the signal at 236 serves to cut off the flow of current through this tube 172 to interrupt the operation of the counter. The values of capacitor 234 and resistor 232 are so chosen that switching tube 172 is cut off for only a small part of the operating cycle of the timer.

The voltage appearing across resistor 232 and capacitor 234 in parallel is differentiated in the R. C. combination comprising capacitor 240 and resistor 242 to produce a signal having a wave form such as that shown at 244, the signal having a relatively large negative peak and a small positive peak. The signal together with the negative bias voltage supplied by battery 246 is impressed upon the control grid of vacuum tube 248, the grid circuit of which includes resistor 242 connected in series with battery 246 to ground. This battery furnishes sufficient bias to cut off this tube in the absence of applied signals. The cathode of this tube is grounded and the plate circuit includes load resistor 250 connected between the plate and the positive terminal of battery 252, the negative terminal of which is connected to ground.

The duration of the transmitting period is determined by the capacitance of capacitor 240, the greater this capacitance, the longer the transmitting period. Referring to the wave forms shown in Fig. 2 it will be recognized that for each negative saw-tooth pulse of the wave shown at 236 a differentiated signal, such as that shown at 244, will be produced. The entire wave form 244 occurs during the period of each saw-tooth 236 when the operation of the counter is interrupted. The small positive pulse of wave 244 is employed to enable the transmitting equipment during some portion of this interval, the exact shape of the pulse being dependent upon the value of capacitor 240.

The positive pulse applied to the grid of tube 248 appears as an amplified negative pulse across load resistor 250 and this amplified pulse is applied through capacitor 253 to amplifier tube 254, the wave form of the voltage applied thereto being substantially as shown at 256. The negative pulse, however, has no effect on the output of tube 248 which is normally biased at cut-off. The grid of amplifier 254 is connected through resistor 258 to the negative terminal of bias battery 260, the positive terminal of which is grounded while the cathode is connected to ground. The plate of the tube is connected through resistor 262 to the positive terminal of battery 264, the negative terminal of which is grounded. Amplifier 254 serves to reverse the phase of the impressed signal and increase its level to a suitable value without materially altering its wave form. The positive pulse produced in the plate circuit of triode 254 is applied through capacitor 266 to the control grids of power amplifier tubes 190, 192 and 194, these control grids being connected in parallel through resistor 268 to the negative terminal of bias battery 270, the positive terminal of which is grounded. The positive pulse so applied to the respective control grids of the power amplifier tubes permits current to flow therethrough during a part of the time that the operation of the counter is interrupted, if positive potentials from the counting stages associated with the amplifier tubes are applied to the screen grids. Thus radio frequency current can flow in power amplifier tubes 190, 192 or 194 only when a positive pulse from the timer occurs simultaneously with the application of a positive potential from the counting stages with which they are respectively associated.

In the operation of the coder and transmitter shown by way of example in Fig. 2 the complex wave form to be transmitted is applied through terminal equipment to comparator 18 in which its instantaneous amplitude measured from ground with a superimposed bias sufficient to make all amplitudes of one polarity is compared with a voltage proportional in amplitude to the counting sum appearing at the counter output terminals 140 . . . 138, and 136. If these two amplitudes differ, a difference of potential is generated between comparator output leads 156 and 158 and this difference of potential is applied to control tubes 164 and 166 to permit application of the output of counter oscillator 160 to the input of the counting circuit.

At the same time the polarity of the difference in potential between leads 156 and 158 determines the direction in which the counting circuit operates. The phase relationships throughout the counter control circuits are such that the counter will count to increase its sum output if the instantaneous amplitude of the complex wave to be transmitted exceeds the amplitude of voltage proportional to the sum output generated by the counter and counts downwardly if the opposite condition obtains.

In the presence of an amplitude difference, impulses from oscillator 160 after passage through control tubes 164 and 166 are applied to switching tube 172 through which they pass to counter input terminal 72 unless transmission of a code group is in progress. In this latter event, switching tube 172 is cut off and operation of the counter is momentarily interrupted for the duration of the transmisson. At any time the group of voltages appearing at the several counter output terminals 140 . . ., 138, and 136, respectively, of counter stages 58 . . . 56, and 54, taken in the order given, form a binary code representation of the number of impulses delivered by oscillator 160 and thus of the instantaneous amplitude of the complex wave to be transmitted. These voltages are applied to the separate subchannels of the radio transmitter which is switched on and off by the timer which serves also to interrupt the operation of the counting circuit at predetermined instants and synchronizes the operation of the two units. In those subchannels of the transmitter in which the transmitting period coincides with the presence of an "on" signal voltage at the output of the associated counting stage radio frequency energy is transmitted.

The receiving equipment indicated generally at 28, 30 and 32 in Fig. 1 may be of any suitable type, for example, radio receiver 38 may be a conventional superheterodyne receiver capable of broad band response, the intermediate frequency output of which will include a different frequency component for each of the activated subchannels. The intermediate frequency output of this receiver is applied to decoder 30 which is arranged to derive therefrom a complex wave form reproducing that impressed upon the input of the transmitting equipment. One form of decoder suitable for this purpose is disclosed in Fig. 5 of United States Patent 2,272,072, issued February 3, 1942, on an application filed in the name of Alec Harley Reeves. Briefly, the decoder disclosed in this patent includes a group of filters for separating the several alternating current voltages present in the intermediate frequency output of the receiver and applying them to a counter having the same number of stages as the counter employed in the transmitter. (In the patent five counting stages are employed.) These voltages are rectified and utilized to condition the counter so that the sum indicated thereon is the same as that indicated at the output terminals of the transmitter. The rectified output of the receiver is also utilized to trigger on an impulse generating circuit which after a slight delay causes the counter to count until its full capacity is reached. During the counting period current is permitted to flow through an amplifier, the duration of this current flow being proportional therefore to the difference between the total capacity of the counter and the sum indicated by the transmitted binary code group of voltages. This output is filtered to obtain the desired reproduction of the complex wave form applied to the transmitter. For further details concerning this receiver and decoder reference is made to the above-identified patent.

What is claimd is:

1. In a communication system for transmitting complex waves, a coder for expressing the instantaneous amplitude of a complex wave to be transmitted in n-digit binary code comprising a reversible binary counter of n stages each stage having an operated and an unoperated condition, output connections from each of said stages providing an output voltage change when the corresponding stage is in the operated condition, and means responsive to the amplitude of the complex wave to be transmitted to control the direction of counting of said counter for maintaining the n-digit binary code group formed by the voltages appearing at said output connections representative of said amplitude.

2. In a communication system for transmitting complex waves, a coder for expressing the amplitude of a complex wave to be transmitted in binary code of n denominational orders comprising a binary counter of n stages each stage having an on and an off condition, means for deriving from each on stage a voltage proportional to the binary code amplitude represented thereby, and means responsive to the sum of these voltages and to the amplitude of the complex wave to be transmitted for controlling the operation of the counter.

3. In a communication system for transmitting complex waves, a coder for generating an n-digit binary code representative of the amplitude of a complex wave to be transmitted comprising an n-stage binary counter each stage having an operated and an unoperated condition, means for deriving from each operated stage a voltage proportional to the binary code amplitude represented thereby, and means for comparing the sum of said voltages with the amplitude of the complex wave to be transmitted and causing the counter to operate whenever said sum differs from the amplitude of the complex wave.

4. In a communication system for transmitting complex waves, an n-stage binary counter for expressing the amplitude of a complex wave in n-digit binary code each counter stage having operated and unoperated conditions and an output connection at which a voltage change occurs when that stage is operated, the voltages at the output connections forming an n-digit binary code group, means for generating a voltage proportional to the amplitude represented by said code group, and means responsive to the difference between the amplitude of the complex wave to be transmitted and the amplitude of said generated voltage for causing the counter to operate to equalize said amplitudes.

5. In a communication system for transmitting complex waves, a coder for expressing the amplitude of a complex wave in n-digit binary code comprising a reversible n-stage binary counter each stage having operated and unoperated conditions and an output connection at which a voltage change occurs when that stage is operated, the voltages at the output connections forming an n-digit binary code group, means for generating a voltage proportional to the amplitude represented by said code group, and means responsive to the difference between the amplitude of the complex wave to be transmitted and the amplitude of said generated voltage for causing the counter to operate in the proper direction to equalize said amplitudes.

6. In a communication system for transmitting complex waves, a counter for expressing the amplitude of a complex wave in n-digit binary code comprising an n-stage binary impulse counting circuit, an output connection for each stage, means for generating an output voltage for each operated stage proportional to the binary code amplitude represented thereby, a pulse generator for operating said counter, and control means for said pulse generator responsive to the sum of said output voltages and to said complex wave rendering it effective to operate the counter whenever the amplitude represented in binary code by the counter output voltages differs from the amplitude of the complex wave to be transmitted.

7. In a communication system for transmitting complex waves, a coder comprising an n-stage binary impulse counting circuit, an output connection for each stage, means for generating an output voltage proportional to the amplitude increment represented by each operated stage, said voltages forming a binary code group, a pulse generator for operating said counter, control means for said pulse generator responsive to the sum of the output voltages of said operated stages and to said complex wave for rendering said pulse generator effective to operate the counter whenever the amplitude represented in binary code by the counter output voltages differs from the amplitude of the complex wave to be transmitted, separate subchannels for transmitting said counter output voltages to a receiving station, and means for disconnecting the pulse generator from the counter circuit at predetermined times and transmitting said output voltages over said subchannels.

8. The method of providing code signals representative of complex signals to be transmitted comprising continuously producing code groups in response to a complex signal to be transmitted, regenerating from said continuous code groups a representation of the signal to be transmitted, comparing said regenerated signal with the original complex signal, and correcting the generated code signals in accordance with the result of said comparison.

9. In a communication system for transmitting message waves, a coder for expressing the instantaneous amplitude of a message wave in binary code comprising means responsive to said wave for producing binary code groups of pulses, means for deriving from each of such code groups a voltage proportional to the amplitude represented thereby, means for comparing said derived voltage with the instantaneous amplitude of said message wave to obtain a control quantity and means responsive to said control quantity for correcting the code group output of said code group producing means.

*10. An electric pulse code modulator for the simple addition binary code comprising a periodically operating counting device arranged to build up a potential wave the amplitude of which changes progressively in discrete steps, said counting device comprising a chain of binary counting stages each operated by the previous one, and means for applying to the first stage a train of regularly repeated trigger pulses, means for comparing the potential wave with a signal wave potential, means for stopping the operation of the counting device when the difference of the two wave potentials has reached a specified value, and means for deriving from each counting stage a potential representing one binary digit of the total number of successive binary digits characterizing the signal wave amplitude at substantially the given instant when the difference of the two wave potentials has reached said specified value.*

*11. A modulator according to claim 10 for a code of m units, comprising m binary counting stages each of which consists of a two-condition device and adapted to produce when operated an output-voltage proportional to $2^{r-1}$ where r is the number of the stage in the series and takes all values from 1 to m, and means for adding together the output voltages of all operated stages.*

RAYMOND A. HEISING.

References Cited in the file of this patent or the original patent

UNITED STATES PATENTS

| Number | Name | Date |
|---|---|---|
| 2,272,070 | Reeves | Feb. 3, 1942 |
| 2,307,868 | Stibitz | Jan. 12, 1943 |
| 2,373,134 | Massonneau | Apr. 10, 1945 |
| 2,381,928 | Roberts | Aug. 14, 1945 |
| 2,402,432 | Mumma | June 18, 1946 |
| 2,406,019 | Labin | Aug. 20, 1946 |
| 2,417,831 | Kinkead | Mar. 25, 1947 |
| 2,418,521 | Morton et al. | Apr. 8, 1947 |
| 2,426,454 | Johnson | Aug. 26, 1947 |
| 2,437,707 | Pierce | Mar. 16, 1948 |
| 2,451,044 | Pierce | Oct. 12, 1948 |
| 2,453,461 | Schelleng | Nov. 9, 1948 |
| 2,568,724 | Earp et al. | Sept. 25, 1951 |